United States Patent
Singh et al.

(10) Patent No.: US 10,198,858 B2
(45) Date of Patent: Feb. 5, 2019

(54) METHOD FOR 3D MODELLING BASED ON STRUCTURE FROM MOTION PROCESSING OF SPARSE 2D IMAGES

(71) Applicant: 3Dflow Srl, Udine (IT)

(72) Inventors: Yash Singh, San Diego, CA (US); Roberto Toldo, Sona (IT); Luca Magri, Milan (IT); Simone Fantoni, Buttapietra (IT); Andrea Fusiello, Udine (IT)

(*) Notice: Subject to any disclaimer, the term of this patent is extended or adjusted under 35 U.S.C. 154(b) by 128 days.

(21) Appl. No.: 15/470,863

(22) Filed: Mar. 27, 2017

(65) Prior Publication Data

US 2018/0276885 A1 Sep. 27, 2018

(51) Int. Cl.
*G06T 17/00* (2006.01)
*G06T 17/20* (2006.01)

(52) U.S. Cl.
CPC ............. *G06T 17/20* (2013.01); *G06T 17/00* (2013.01); *G06T 2210/56* (2013.01); *G06T 2215/16* (2013.01)

(58) Field of Classification Search
CPC ..... G06T 17/00; G06T 17/20; G06T 2210/56; G06T 2215/16
See application file for complete search history.

(56) References Cited

U.S. PATENT DOCUMENTS

| | | |
|---|---|---|
| 6,711,293 B1 | 3/2004 | Lowe |
| 8,837,811 B2 | 9/2014 | Sinha et al. |
| 2008/0310757 A1* | 12/2008 | Wolberg ............ G06K 9/00208 382/285 |

(Continued)

FOREIGN PATENT DOCUMENTS

EP 1850270 6/2010

OTHER PUBLICATIONS

Carandall, D., Owens, A., Snavely, N., & Huttenlocher, D. (2011). Discrete-continuous optimization for large-scale structure from motion. Computer Vision and Pattern Recognition (CVPR), 2011 IEEE Conference on, (pp. 3001-3008).

(Continued)

*Primary Examiner* — Ke Xiao
*Assistant Examiner* — Jed-Justin Imperial
(74) *Attorney, Agent, or Firm* — Themis Law

(57) ABSTRACT

A method based on Structure from Motion for processing a plurality of sparse images acquired by one or more acquisition devices to generate a sparse 3D points cloud and of a plurality of internal and external parameters of the acquisition devices includes the steps of collecting the images; extracting keypoints therefrom and generating keypoint descriptors; organizing the images in a proximity graph; pairwise image matching and generating keypoints connecting tracks according maximum proximity between keypoints; performing an autocalibration between image clusters to extract internal and external parameters of the acquisition devices, wherein calibration groups are defined that contain a plurality of image clusters and wherein a clustering algorithm iteratively merges the clusters in a model expressed in a common local reference system starting from clusters belonging to the same calibration group; and performing a Euclidean reconstruction of the object as a sparse 3D point cloud based on the extracted parameters.

11 Claims, 12 Drawing Sheets

(56) References Cited

U.S. PATENT DOCUMENTS

| | | | |
|---|---|---|---|
| 2013/0155058 A1* | 6/2013 | Golparvar-Fard | G06T 19/006 345/419 |
| 2013/0201187 A1 | 8/2013 | Tong et al. | |
| 2014/0218353 A1* | 8/2014 | Solem | G06T 19/20 345/419 |
| 2014/0219550 A1 | 8/2014 | Popa et al. | |
| 2017/0124712 A1* | 5/2017 | Liu | G06T 7/73 |
| 2018/0189602 A1* | 7/2018 | Hellier | G06K 9/00677 |

OTHER PUBLICATIONS

Esteban, C. H., & Schmitt, F. (2004). Silhouette and stereo fusion for 3D object modeling. Computer Vision and Image Understanding, 96, 367-392.

Farenzena, M., Fusiello, A., & Gherardi, R. (2009). Structure-and-motion pipeline on a hierarchical cluster tree. Computer Vision Workshops (ICCV Workshops), 2009 IEEE 12th International Conference on, (pp. 1489-1496).

Gherardi, R., & Fusiello, A. (2010). Practical autocalibration. European Conference on Computer Vision, (pp. 790-801).

Lindeberg, T. (1998). Feature detection with automatic scale selection. International journal of computer vision, 30, 79-116.

Seitz, S. M., Curless, B., Diebel, J., Scharstein, D., & Szeliski, R. (2006). A comparison and evaluation of multi-view stereo reconstruction algorithms. Computer vision and pattern recognition, 2006 IEEE Computer Society Conference on, 1, pp. 519-528.

Tola, E., Lepetit, V., & Fua, P. (2010). Daisy: An efficient dense descriptor applied to wide-baseline stereo. IEEE transactions on pattern analysis and machine intelligence, 32, 815-830.

Toldo, R., Gherardi, R., Farenzena, M., & Fusiello, A. (2015). Hierarchical structure-and-motion recovery from uncalibrated images. Computer Vision and Image Understanding, 140, 127-143.

Triggs, B. (1997). Autocalibration and the absolute quadric. Computer Vision and Pattern Recognition, 1997. Proceedings., 1997 IEEE Computer Society Conference on, (pp. 609-614).

Wu, C. (2013). Towards linear-time incremental structure from motion. 3DTV-Conference, 2013 International Conference on, (pp. 127-134).

\* cited by examiner

METHOD FOR 3D MODELLING BASED ON STRUCTURE FROM MOTION PROCESSING OF SPARSE 2D IMAGES

FIELD OF THE INVENTION

This document relates to structure from motion based processing of several sparse images for the purpose of extracting information of a plurality of objects, each of which is common to all the images.

A three-dimensional model of one or more objects is created from a set of sparse two dimensional images of the objects taken from different angles. This model in turn yields accurate measurements of the desired objects. These measurements may be used for a variety of purposes such as 3D printing, aerial surveys, geo-mapping, including but not limited to matching anthropometric dimensions to a corresponding attire, whether such attire be an apparel or accessories.

To create the three-dimensional model, a camera is utilized to capture several images of an object. The images are taken from various angles to provide as many perspectives of the object as desired. No specific restrictions are placed on the distance, sequence or angle of the photographic images taken. Analysis is undertaken during and after all the images related to the given object have been captured. The image processing will extract relevant features from each of the images, and identify corresponding points across all the images. A distinctive descriptor is assigned to each point. Scale invariant image processing algorithms are used to determine which bundle of images should be clustered for efficient processing. This fore said information is in turn used to create a matching table and to automatically extract all the camera's internal and external parameters. Stereo matching algorithms are applied to extract a dense point cloud. The extracted cloud of corresponding points is assembled to recreate a high level textured model than can in turn be rotated and examined in 3D space.

BACKGROUND OF THE INVENTION

Structure from motion (SfM) refers to the process of estimating three-dimensional structures of the scene and motion of the cameras from point correspondences in two-dimensional image sequences. Camera motion refers to camera internal (namely focal length, radial distortion and principal point) and external (camera position and orientation) parameters.

Single features of the object are expected to be present in more than one image. For example, a feature at position $x_1$ in the first image $I_1$ may be detected at position $x_2$ and $x_3$ in the second and third images $I_2$ and $I_3$, respectively. Such a tuple of corresponding features is called correspondence. If the cameras and their positions in space are known, it is possible to reconstruct 3D points of the observed object directly. This can be achieved by intersecting the rays from the camera centers through the feature points of one particular correspondence. This technique is called triangulation. However, in the case of unknown camera parameters, the images only shall be used.

Literature teaches several approaches for solving the problem of estimating three-dimensional structures of the scene and motion of the cameras from point correspondences in two-dimensional image sequences. Classical SfM pipelines process images in batch and handle the modeling process making no assumptions on the imaged scene or on the acquisition rig (Farenzena, Fusiello, & Gherardi, 2009). U.S. Pat. No. 8,837,811 (2014) describes a SfM pipeline to estimate camera external parameters using a two-step approach. Existing pipelines either assume known internal parameters, or constant internal parameters, or rely on EXIF data combined with external information (camera CCD dimensions) (Crandall, Owens, Snavely, & Huttenlocher, 2011) (Wu, 2013). Despite automatic internal camera calibration method (autocalibration) are already known in literature (Triggs, 1997) (Gherardi & Fusiello, 2010) (Toldo, Gherardi, Farenzena, & Fusiello, 2015), what is missing is a reliable system to estimate both internal and external parameters with a clustering procedure that favors the clustering of cameras with the same internal parameters.

Every SfM pipeline employs robust keypoint detectors and descriptors in the very first phase. Keypoints are distinctive and repeatable points that are extracted from each image. Typical detectors used in SfM pipelines are based on Laplacian of Gaussian (Lindeberg, 1998) or Difference of Gaussian (U.S. Pat. No. 6,711,293 B1, 2004). The neighborhood of every keypoint is coded into a descriptor, i.e. a numerical description of the properties of the image patch surrounding the keypoint. This allows the keypoints to be matched across different images. Several descriptors have been proposed in literature (Tola, Lepetit, & Fua, 2010; U.S. Pat. No. 6,711,293 B1, 2004) (US Patent No. EP1850270 B1, 2010). In SfM it is important to use descriptors both robust to noise and photometric deformation. While time is not a critical issue during the keypoint extraction phase, it becomes important during descriptors matching because the complexity can rise fast with the number of employed images. What is missing is a descriptor and a matching algorithm specifically tailored for Structure from Motion tasks and a procedure to discover neighbor images by using the least information possible.

When the camera internal and external parameters are extracted, a dense point cloud and a surface are extracted. The goal of Multi-view Stereo (MVS) is to extract a dense 3D surface or point cloud reconstruction from multiple images taken from known camera viewpoints. The camera internal and external parameters may come from an automatic SfM approach or a pre-calibrated environment. This is a well-studied problem with many practical and industrial applications. Laser scanners yield to very accurate and detailed 3D reconstructions. However, they are based on expensive hardware, difficult to carry and rather complex to set, especially for large-scale outdoor reconstructions. In all these cases, MVS can be applied successfully. In Seitz, Curless, Diebel, Scharstein, & Szeliski (2006) several multiview stereo algorithms are presented and a full taxonomy is drawn. In US Patent No. US20130201187 (2013) an image-based multi-view stereo process is applied to face generation. The method makes use of facial landmarks detection in a multi-view stereo process. What is missing is a scalable MVS stereo system strongly guided by the structure and visibility information extracted by the SfM information pipeline.

Some MVS techniques use automatic or manually extracted silhouettes for reconstructing 3D object visible that are completely visible in all images or to simply discard the background information. The silhouettes can also be used to enhance the reconstruction process (Hernandez Esteban & Schmitt, 2004). In US Patent No. US20140219550 (2014) silhouettes are extracted in an automatic way and are used to estimate poses of articulated 3D object. When using silhouettes, the major problem is that simple errors during the extraction process lead to big reconstruction errors. What is missing is an accurate general purpose procedure for guided silhouette extraction.

SUMMARY OF THE INVENTION

This document describes apparatus, method and techniques for creating a 3D model through the processing of a series of sparse photographic images taken from different angles with a conventional camera, including but not limited to cameras found in consumer mobile handsets.

A camera is utilized to capture several images of an object. The images are taken from various angles so as to provide as many perspectives of the object as desired. No specific restrictions are placed on the distance, sequence or angle of the photographic images taken. Analysis is undertaken during and after all the images related to the given object have been captured. The image processing will extract relevant features from each of the images, and identify keypoints and correspondence across all the images.

Scale invariant image processing algorithms are used to determine which bundle of images should be clustered for efficient processing. This fore said information is in turn used to create a matching table and to automatically extract all the cameras internal and external parameters. Stereo matching algorithms are applied to extract a dense point cloud. The extracted cloud of corresponding points are assembled to recreate a high level textured model than can in turn be rotated and examined in 3D space.

Object of the invention is a method of the Structure from Motion type for processing a plurality of sparse images acquired by one or more acquisition devices for the generation of a sparse 3D points cloud and of a plurality of internal and external parameters of the acquisition devices obtained by a processing of said images, comprising the following steps:

(a) collecting said images;
(b) extracting keypoints from each image and generating a descriptor for each keypoint;
(c) organizing the images in a proximity graph;
(d) pairwise image matching and generating keypoints connecting tracks according to the maximum proximity between the keypoints themselves;
(e) performing an autocalibration between image clusters to extract the internal and external parameters of the acquisition devices,
(f) performing a Euclidean reconstruction of the object in form of said sparse 3D point cloud based on the parameters extracted at the preceding step.

In one embodiment, the optimal number of keypoints to be extracted for each image is computed by using a global response score threshold, considering all the keypoints extracted from all the images. As a matter of example, a response score value can be extracted for a single keypoint as the absolute response of gradient filters or Laplacian of Gaussian filters applied in the image position of the keypoint. The keypoint extraction phase comprises calculating a response score for each keypoint, and a predetermined number of keypoints with the higher response scores are taken into account, while the further keypoints are disregarded.

In one embodiment, the descriptors carry information specific to the point neighborhood by making use of steerable derivative filters. One or several local rotations may be extracted for each keypoint. The filters are steered coherently with the keypoint rotation in a continuous way. The filters may be precomputed along a discrete set of directions. The response of each filter is evaluated on radial cells placed at different distances from the points. The descriptor is encoded into a one-dimensional histogram where each bin collects the score coming from each cell and along each direction. In a preferred embodiment, the descriptor is calculated on a circular region placed around the keypoint and subdivided into subregions. The descriptor is constituted by a histogram comprising a predetermined number of bins which can assume different values, being the values calculated on the basis of the response of each single pixel belonging to each subregion to a steering filter which is steered in a predetermined number of orientations.

In one embodiment, the parameters extracted from the processing of the images are based on a 2-step algorithm comprising a first autocalibration process to extract internal camera parameters with clusters of cameras of fixed maximum size and a subsequent Euclidean reconstruction with known camera internal parameters. In a preferred embodiment, at the autocalibration step a plurality of calibration groups is defined, each calibration group containing a plurality of image clusters, using a clustering algorithm such that the clusters are iteratively merged in a model expressed in a common local reference system. Clustering may be carried out starting from clusters belonging to the same calibration group. In a further preferred embodiment, the autocalibration step is hierarchical and comprises of a projective stereo modeling step in case of single images merging, a resection/intersection step in case of adding an image to a cluster, and a merging of two models step in case of merging two groups reconstructed independently one to each other. In a further preferred embodiment, the images are associated to EXIF parameters and the calibration groups are formed based on the similarity between the EXIF parameters of the images. In a further preferred embodiment, at the reconstruction step a plurality of calibration groups is defined, each calibration group containing a plurality of image clusters, and wherein a clustering algorithm is used such that the clusters are iteratively merged in a model expressed in a common local reference system, being the clustering carried out starting from clusters belonging to the same calibration group.

In one embodiment, the images are organized in a rough proximity graph, that is first built by using a subset of points of each image. The points with a larger scale are chosen for each image and matched against all the other subsets of the other images to compute the proximity score of images. Couples of neighbor images are then extracted from this fore said graph by iterating a maximum spanning tree algorithm several times in order to guarantee a k-edge connection on the resulting sub-graph. In a preferred embodiment, the organization of images in the proximity graph comprises the iteration of a maximum spanning tree algorithm to identify the maximum number of connections between images corresponding to the maximum similarity score, by means of the following substeps:

(c1) identifying a path connecting the images, such that the similarity is maximum for adjacent images;
(c2) saving the image couples for subsequent processings;
(c3) setting to zero the similarity of the image couples identified;
(c4) identifying a further path connecting the images, such that the similarity is maximum for adjacent images;
(c5) saving the further image couples for the subsequent processings;
(c6) setting to zero the similarity of the further image couples identified;
(c7) iterating steps from (c4) to (c6).

In one embodiment, the sparse structure information of the scene is used to guide the stereo matching, so that the Structure from Motion method is followed by a phase for generating a 3D model by means of a Multiview Stereo algorithm based on said sparse 3D points cloud and on said internal and external parameters of the acquisition devices. The Multiview Stereo algorithm comprises computing a depth map for each image and subsequently generating a dense 3D points cloud based on all the computed depth maps. The depth search range of each pixel of each image is limited by using the sparse 3D points viewed by the image itself. Only the points that are closer to the optical ray are considered and a function of their distance is employed to compute the minimum and maximum depth along the ray.

In one embodiment, prior to assembly of the final 3D model, a global outlier removal procedure is implemented to increase the accuracy of the final 3D space model. This procedure is based on specific criterions including the matching score and the visibility information of each point. Each point is project on each image 2D pixel. For each pixel, the point with the maximum matching score and viewed by the image itself is considered to be occluding the other point of the same cell. A function of the matching score of the occluding point is subtracted from the matching score of the other points. When a point reaches a negative matching score is marked as outlier and removed. The procedure is iterated several times over all the images until convergence, i.e. no more points are removed.

In one embodiment, silhouettes of the object in the 2D images are used to guide the stereo processing and to remove the background area coherently. An interactive silhouette selection tool is defined. The image is decomposed into superpixels, i.e. cluster of continuous pixels with low color variation. The user is asked to mark a background area and a foreground area. The algorithm automatically classifies background and foreground superpixels with a region growing approach thus defining the silhouette. Silhouettes may be used as input of a space carving technique or to remove the background during the stereo matching phase. In a preferred embodiment, the phase for extracting silhouettes from the background of an image comprises the following steps:

(g) subdividing the image in groups of contiguous pixels with color variation lower than a predetermined threshold;

(h) displaying the image to a user;

(i) identifying by the user at least an area in the fore-ground and at least an area in the back-ground in the image by means of tracing at least two marks on the image, being the marks traced with different modality to indicate the fore-ground area and the back-ground area respectively;

(j) creating two clusters of groups of pixels relative to the fore-ground and the back-ground respectively;

(k) assigning the group of pixels touched by each mark of the user to one of the two clusters of group of pixels based on the modality of such mark;

(l) creating a temporary list of groups of pixels not yet assigned to one of the two clusters;

(m) assigning iteratively the group of pixel which is present in the temporary list and has the minimum difference of mean color with respect to one of its adjacent groups of pixels to the cluster of group of pixel to which such one of its adjacent groups of pixels belongs.

The invention relates also to a system for generating a 3D model of an object of interest, said system comprising at least a device for acquiring images and a processing unit configured to carry out the method described below.

These and other aspects, their implementations are described in detail in the drawings, the description and the claims.

DETAILED DESCRIPTION OF EMBODIMENTS OF THE INVENTION

An automatic measurement device composed of a visible spectrum camera that captures from a plurality of viewpoints is provided. The present invention includes a fully automatic reconstruction pipeline able to recover the 3D object shape and both the internal and external device parameters.

Embodiments will be described below referring to FIG. 1 to FIG. 12 Error! Reference source not found.

Figure 1:
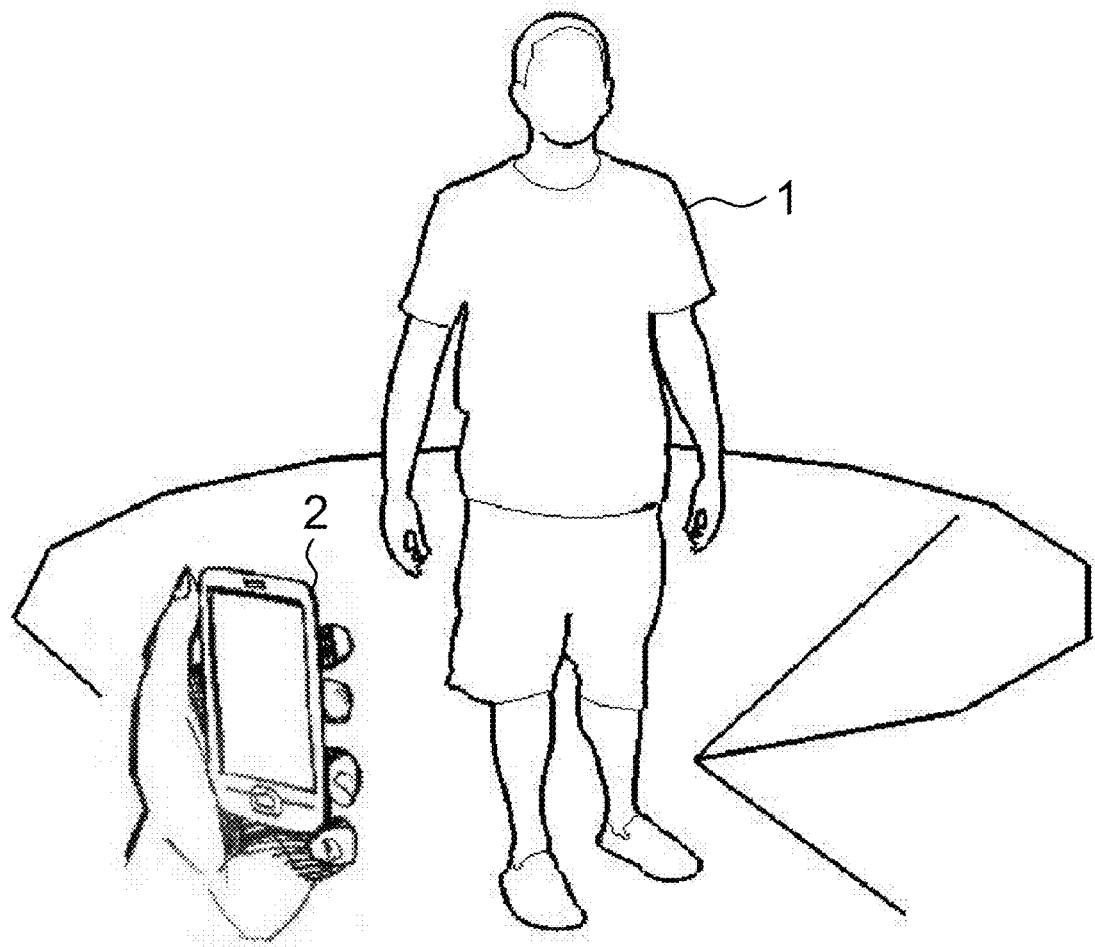
FIG. 1 shows a typical example of photo acquisition. In this example the object is a human body, and the subject stands still while photos are taken around the subject with a camera equipped device.

Referring to FIG. 1, the object of the three-dimensional modelling is a human being. The subject 1 is required to stand still while a variety of captures is taken. The device can be any device equipped with a visible spectrum camera. In alternative, all the captures can be taken simultaneously using a variety of different devices. The object of the reconstruction can be either the full body or a specific part of the body. The example of FIG. 1 shows a graphical illustration of one of the possible acquisition procedures where the subject 1 stands still and the acquisition device 2 rotates around him.

Figure 2:
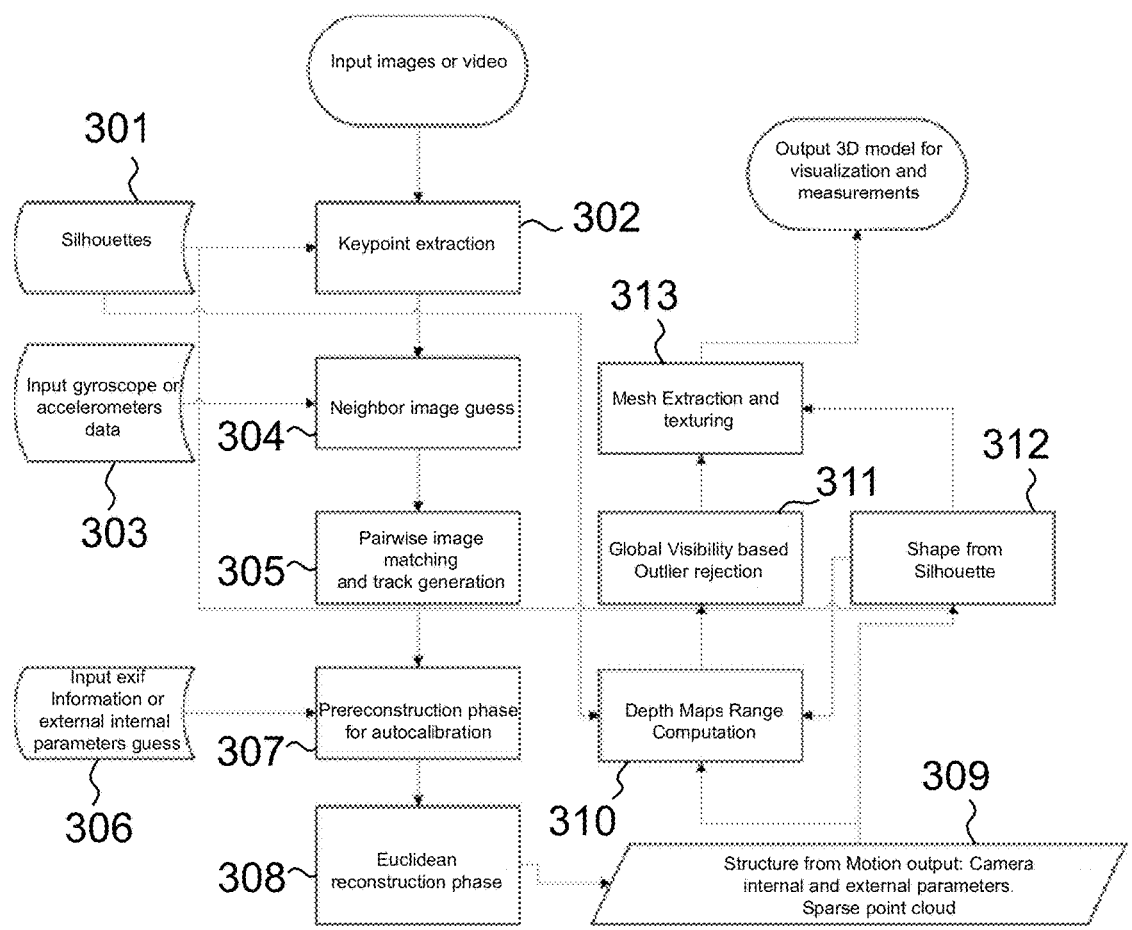
FIG. 2 shows the entire 3D reconstruction pipeline from the inputting of the 2D photos to the creation of a 3D colored model.

FIG. 2 is a block diagram illustrating the entire reconstruction pipeline. Starting from a plurality of images, the processing can recover the 3D shape by means of a 3D textured model. Measurements and scaling operations can be performed to the extracted model. A computing device is required for the processing. In alternative, the whole processing can be made on a server and the result returned back to the client device after the computation.

Figure 4:
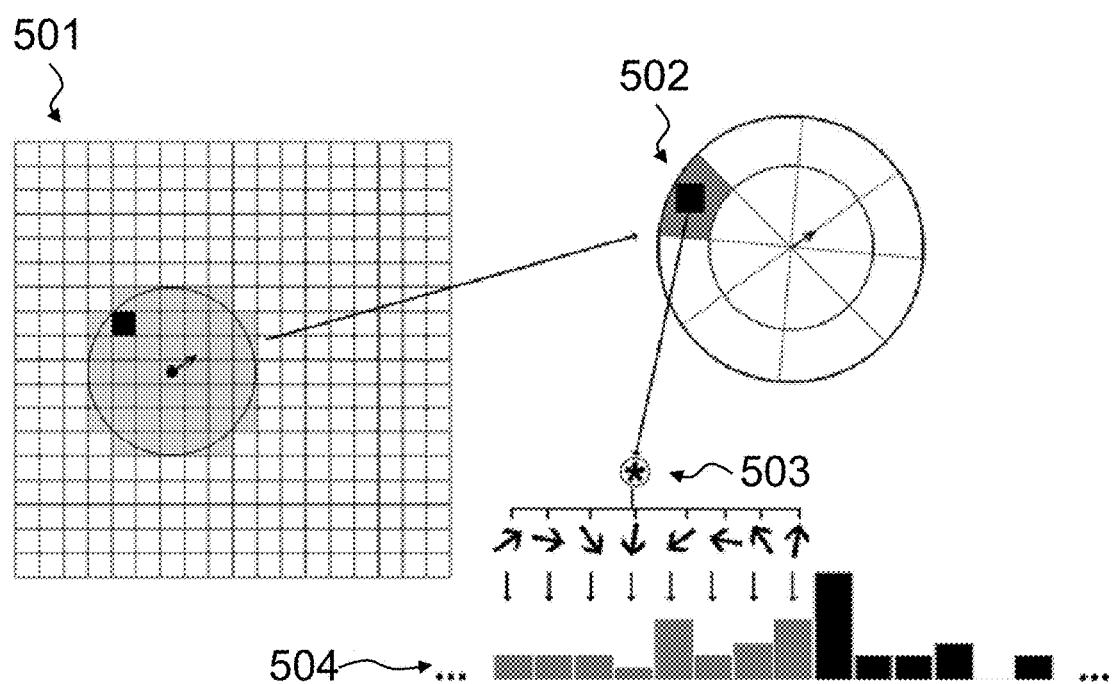
FIG. 4 shows how the descriptor for each keypoint is computed.
Figure 5:
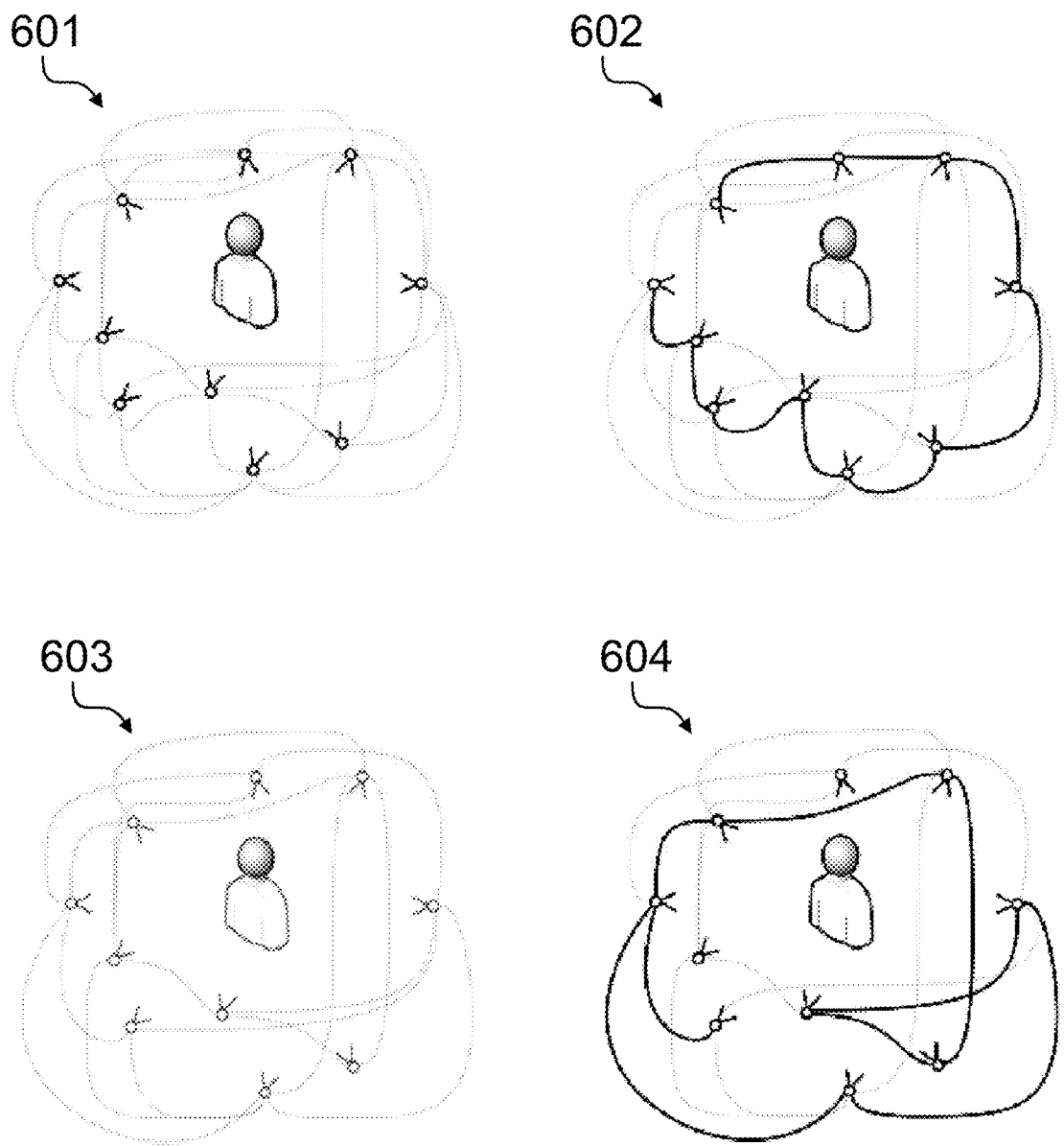
FIG. 5 shows an example of how couple of images are chosen for matching, starting from an approximate neighborhood graph and using an iterative minimum spanning tree (MST) scheme.

Silhouettes 301 can be optionally used in combination with images in several phases of the reconstruction pipeline. Silhouettes may be extracted either with any generic manual or automatic method or with the method illustrated in FIG. 12 and presented hereafter. At block 302, feature points are extracted from the images. The feature point detector is scale invariant and should have a high repeatability. Several feature point extractor can be suitable, as example the one presented in (U.S. Pat. No. 6,711,293 B1, 2004) and (Lindeberg, 1998). A score response is often associated to every extracted keypoint. A histogram descriptor is associated to each point as illustrated in FIG. 4 and presented hereafter. Next, at block 304, the unordered input images may be organized in a proximity graph as illustrated in FIG. 5, this process is presented in greater details hereafter in the present disclosure. Optionally input gyroscope or accelerometers data 303 can be used as ancillary information to determine neighboring images.

At block 305 a narrow matching phase can be performed. In particular, keypoint matching may be connected into tracks following a nearest neighbor approach integrated with several possible sanity checks. As an example, in one embodiment, a first sanity check may consist in rejecting those keypoints for which the ratio of the nearest neighbor distance to the second nearest neighbor distance is greater than a threshold. In addition matches that are not injective may be discarded, and/or matches that are geometrically inconsistent may be rejected. In addition, geometrical consistency may be tested by robustly estimating homographies and fundamental matrices in a M-estimator Sample Consensus (MSAC) framework. Other suitable techniques can be performed to validate the geometric consistency between matching points alternatively or in addition to the MSAC technique.

In order to speed up the matching phase, whose complexity can rise fast with the number of employed images, a keypoint clustering technique may be employed to produce eight equidistant angular clusters, according to the dominant orientation, as recorded in the descriptor of the keypoint. In this way, only keypoints belonging to the same cluster are matched together.

According to a key insight of the present disclosure, blocks 307 and 308 describe a 2-step hierarchical structure and motion algorithm consisting of a first auto-calibration process to extract internal camera parameters and a subsequent Euclidean reconstruction with known camera internal parameters.

Figure 6:
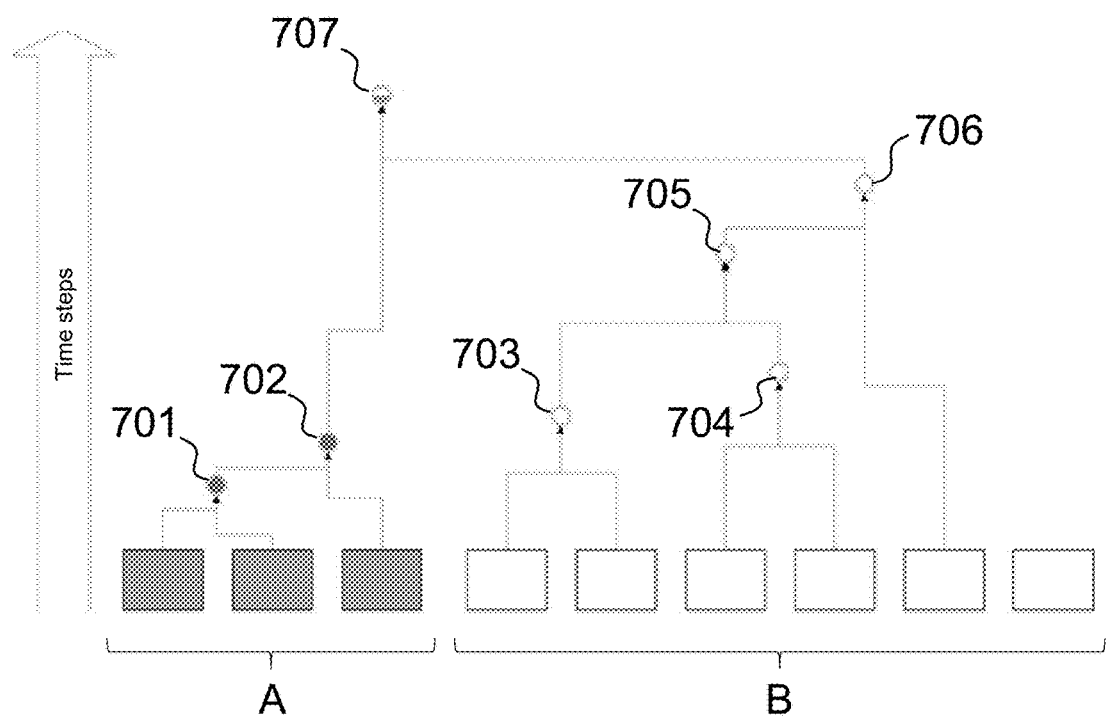
FIG. 6 and FIG. 7 show an example of two-steps hierarchical dendrograms respectively for the autocalibrated reconstruction phase and the Euclidean reconstruction phase.

At block 307, the plurality of images may be organized in a balanced dendrogram that guides the pre-reconstruction and auto-calibration process as explained hereafter and illustrated generally in FIG. 6. Optionally EXIF data and external/internal parameters guess can be used to enhance this process. At block 308, the aforementioned dendrogram may be traversed again in order to produce a Euclidean reconstruction of the object in form of a 3D point cloud, not yet in form of a surface. The output 309 of this process consists in a sparse 3D point cloud, in which a plurality of points is respectively located at a plurality of locations in 3D space relative to a global origin, together with internal and external parameters of the acquisition devices.

The succeeding steps, from 310 to 313, of the pipeline, are devoted to solve the Multi-view Stereo problem, whose goal is to extract a dense 3D surface reconstruction from a plurality of images.

Figure 10:
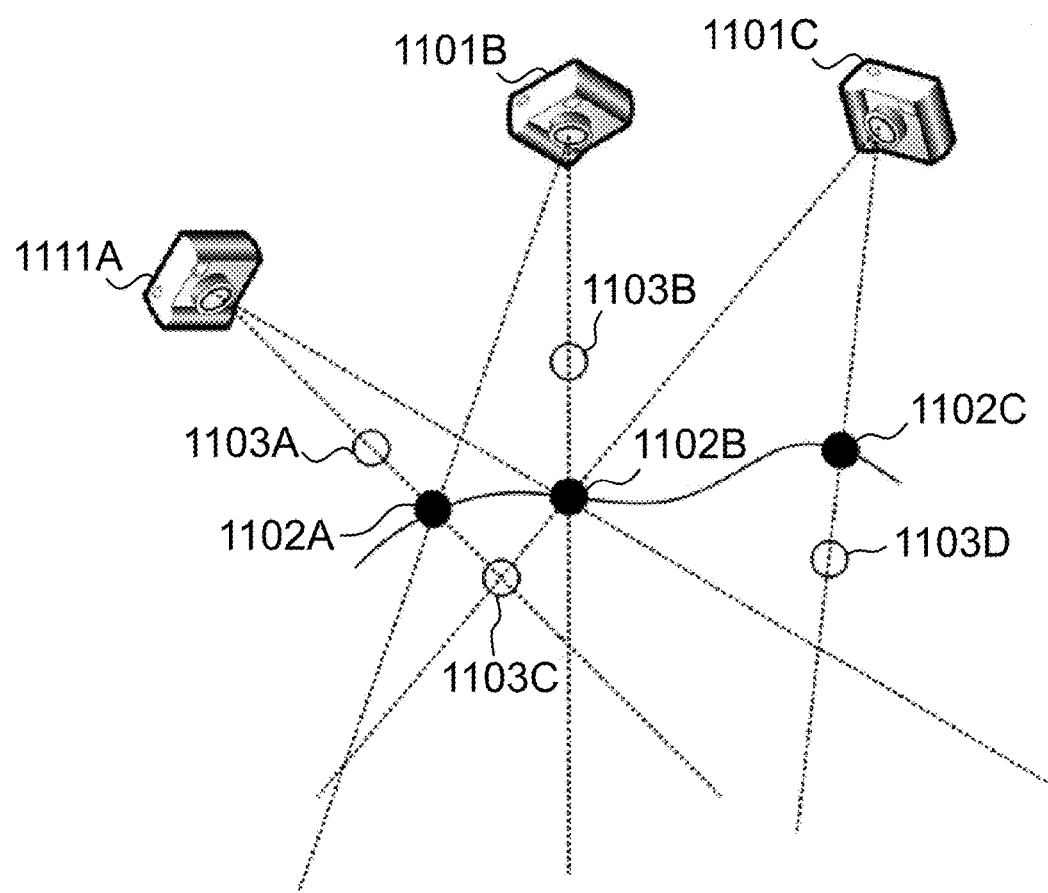
FIG. 10 shows an example of how the visibility constraints are used during the global outlier removal procedure of the multiview stereo process.

The sparse information, previously obtained in 309 from the structure and motion pipeline, may be used to compute depth maps range at block 310. The depth map generation is illustrated in grater details in FIG. 8 and described in what follows. In practice, depth maps can be corrupted by rogue points, therefore, outlier detection strategies, such as those provided by the present disclosure, are desirable. In particular, at block 311, depth maps may be refined and enhanced thanks to a global visibility-based outlier rejection method that is generally illustrated in FIG. 10 and described in more details hereinafter. The sparse output of the structure from motion pipeline may be used at block 312 to recover the shape of the object from the silhouette.

Finally, at block 313, the outputs of these procedures may be combined in order to extract dense 3D surface which describes the scene. The obtained mesh may be colored and textured leveraging on visibility information of the tie points.

Figure 3:
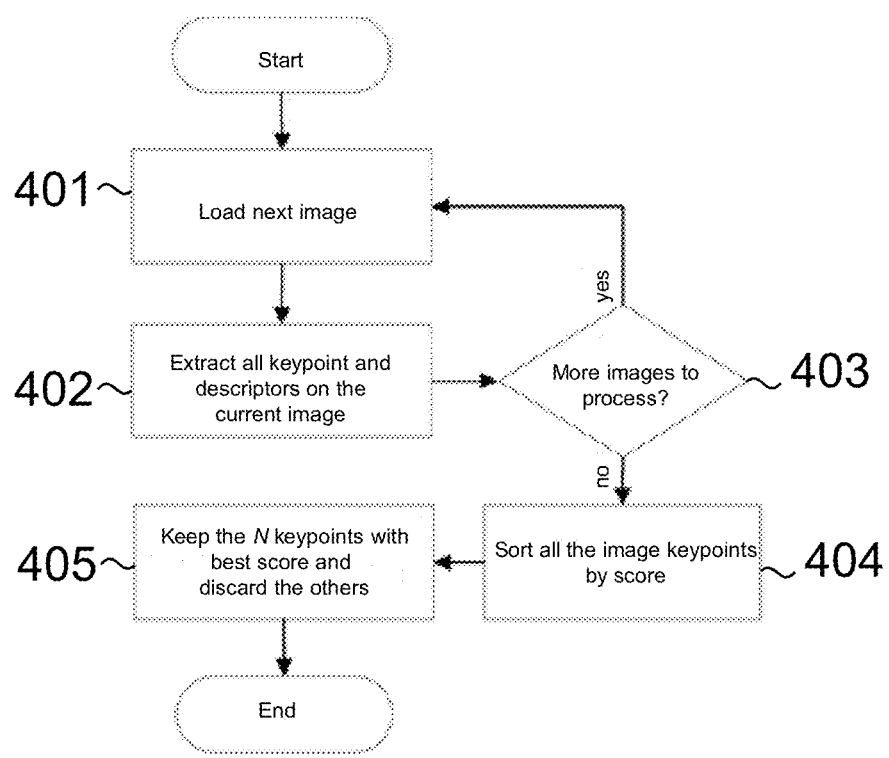
FIG. 3 shows the procedure for extracting and selecting keypoints from the images.

Referring to FIG. 3, a process for extracting and scoring keypoint descriptors from a plurality of images is shown generally as a flow chart. The process includes a first block 401 in which the current image is loaded. Next, at block 402, the keypoint descriptors are extracted. If, at block 403, more images have to be processed, then the procedure is repeated from block 401 to 403, otherwise, according to a key insight of the present disclosure, all the image keypoints are sorted according to their score at block 404. Differently from other implementations, where the best keypoints per image are selected, at block 405, the N keypoints with the best score with respect to all the images are kept and the others are discarded. In this way, the score of the extracted keypoints has a limited variance across the images, resulting in a more reliable matching phase. The number of desired keypoints N may be defined as multiple of the number of images.

Referring to FIG. 4, the keypoint descriptor is presented. Many keypoints detectors and descriptors can be used for the purpose. According to one embodiment of the present disclosure, keypoints may be extracted as blobs with associated scale levels, by detecting scale-space extrema of the scale-normalized Laplacian. Blobs can be defined as bright regions on dark backgrounds or vice versa. Effectively, the scale-normalized Laplacian is normalized with respect to the scale level in scale-space and is defined as $$\nabla^2_{norm} L(x, y; s) = s(L_{xx} + L_{yy}) = s\left(\frac{\partial^2 L}{\partial x^2} + \frac{\partial^2 L}{\partial y^2}\right) = s\nabla^2 (G(x, y; s) * f(x, y))$$

from smoothed image values L(x, y; s) computed from the input image f(x, y) by convolutions with Gaussian kernels, $$G(x, y; s) = \frac{1}{2\pi s} e^{-(x^2+y^2)/(2s)}$$

of different widths $s=\sigma^2$, where $\sigma$ denotes the standard deviation and s the variance of the Gaussian kernel.

Differently from other methods, the image may be not resized along the different scale value of the scale-space. The scale-space extrema may be detected from the points in scale-space at which the scale normalized Laplacian assumes local extrema with respect to space and scale. In this way scale-invariance is ensured, in the sense that interest points are preserved under scaling transformation, and the selected scale levels are transformed in accordance with the amount of scaling. Since the Laplacian operation is rotationally invariant, the detected interest points are also rotationally invariant.

In order to increase the accuracy of the scale estimate, a quadratic polynomial may be fit to the magnitude values around each scale-space extremum to localize the scale-space extremum with a resolution higher than the sampling density over space and scale. Since the Laplacian operator may lead to strong responses along edges, in addition to responding to blob-like and corner-like image structures, it is desirable to suppress such edge-points, which are less useful for matching. For this purpose, several suppression criteria can be formulated. As an example the ratio between the eigenvalues of the Hessian matrix $$HL = \begin{pmatrix} L_{xx} & L_{xy} \\ L_{xy} & L_{yy} \end{pmatrix}$$

computed at the position and the scale of interest points can be efficiently considered by inspecting the trace and the determinant of the Hessian matrix, in particular:

$$\frac{\det HL}{\operatorname{trace} HL} = \frac{L_{xx}L_{yy} - L_{xy}^2}{(L_{xx} + L_{yy})^2} \geq \frac{r}{(r+1)^2}$$

where $r \geq 1$ denotes an upper limit on the permitted ratio between the larger and the smaller eigenvalues. To suppress image features with low contrast, the interest points are usually also thresholded on the magnitude of the response.

At each interest point obtained as above, an image descriptor is computed leveraging on a local histogram of the gradient direction. To obtain scale invariance of the descriptor, the size of this local neighborhood needs to be normalized in a scale-invariant manner. To obtain rotational invariance of the descriptor, a dominant orientation in this neighborhood is determined from the orientations of the gradient vectors in this neighborhood and is used for orienting a radial grid 502 over which the position-dependent histogram is computed with respect to this dominant orientation to achieve rotational invariance.

To determine a preferred orientation estimate for the interest point several methods can be employed. For example, a local histogram of gradient directions may be accumulated over a neighborhood around the interest point with the gradient directions computed from gradient vectors $\nabla L(x, y, s)$ at the detection scale s of the interest point and the area of the accumulation window proportional to the detection scale s, hence peaks are detected in an orientation histogram. To handle situations where there may be more than one dominant orientation around the interest point, multiple peaks are accepted if the height of secondary peaks is above 80% of the height of the highest peak. In the case of multiple peaks, each peak is used for computing a new image descriptor for the corresponding orientation estimate.

When computing the orientation histogram, the increments may be weighted by the gradient magnitude and also weighted by a Gaussian window function centered at the interest point and with its size proportional to the detection scale. Orientations may be computed exploiting a family of pre-computed discrete differentiation kernels, as, for instance, the Prewitt filters.

Alternatively, given the scale and orientation estimate of an interest point, as shown generally at 501, a circular grid is laid out in the image domain, centered at the interest point, with its orientation determined by the orientation of the interest point. In this embodiment, the circular grid comprises two bins in radial direction and 8 in angular direction, which results in a 16 location bins. Each bin represents an angular orientation and, in particular, it represents accumulated sums of the response of each pixel vector to pre-computed steerable filter, adjusted in angle for the orientation of the interest point. In this way, the filters are steered coherently with the keypoint rotation in a continuous way. In this embodiment, a convolution with 8 pre-computed Prewitt filters are used and each bin is weighted with respect to the bin area. In this way, a 128 bin radial descriptor can be derived.

Referring to FIG. 5, the recovery of the proximity graph is illustrated. The goal of proximity graph recovery is to determine which images overlap and or can be matched with each other. In the proximity graph, nodes are the images and edges correspond to epipolar relationships between them. Techniques that consider all the points in each image are known to be computationally demanding. Therefore, alternative broad matching strategies, such as the one provided by the present disclosure, are desirable. In particular, the method described hereafter rely on the idea of selecting a subset of representative points per each image in order to reduce the computational complexity.

As an example, initially all the images are organized in a rough proximity graph 601 by using a selected subset of points of each image. More precisely, the points with a larger scale may be chosen for each image and matched against all the other subsets of the other images to compute the proximity score between images. Therefore, the graph may be defined by the specification of set of vertices and a set of weighted edges set as follows: the vertices are the images and the weighted edge between two images is defined as the number of matches with larger scale between the images. Then couples of neighbor images may be extracted from this fore said graph by iterating a maximum spanning tree algorithm several times in order to guarantee a k-edge connection on the resulting sub-graph. The complete dense graph may be analyzed and the maximum spanning tree 602 may be extracted. In turn, the edge of 602 may be extracted from the original graph and added to the sought sub-graph. From the remaining graph 603, the corresponding maximum spanning tree 604 may be extracted and added to the sub-graph. The procedure is repeated k times, where k is chosen as high as possible in order to ensure that k spanning tree can be extracted from the starting proximity graph.

Figure 7:
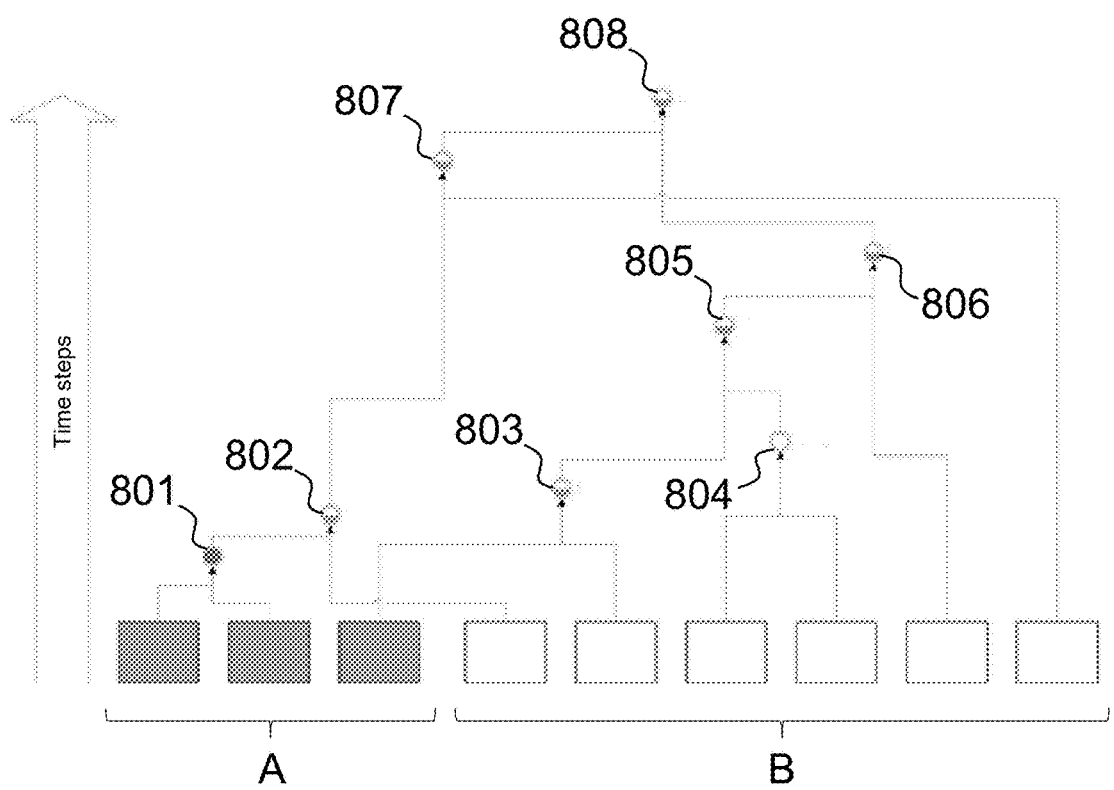

The present disclosure presents a fully automatic reconstruction pipeline able to recover the 3D object shape and both the internal and external acquisition device parameters. Referring to FIG. 6 and FIG. 7, the plurality of images is fed to a 2-step algorithm comprising a first autocalibration process to extract internal camera parameters with a maximum cluster of cameras size and a subsequent Euclidean reconstruction with known camera internal parameters.

As one example illustration, FIG. 6 describes the autocalibration step on a plurality of images. According to a key insight of the present disclosure, the images may be organized in a tree by a tailored agglomerative clustering algorithm that guides the autocalibration process from the leaves to the root. As a result, the problem is broken into smaller instances, which are then separately solved and combined. Referring still to FIG. 6, every node in this fore said tree represents a partial independent model obtained from the corresponding cluster of images. A model is a set of cameras and 3D sparse points expressed in a local reference frame. The agglomerative clustering may rely on a similarity measure tailored for the autocalibration task. The similarity measure on pairs of images may be defined in terms of the overlap of images and EXIF information, in particular it may be computed by taking into account several aspects. According to an example embodiment of the present disclosure, the number of tie-points visible in both images, how well their projections spread over the images and the similarity between EXIF parameters may be taken into account to define the similarity measure. The similarity between clusters may be computed, according to the simple linkage rule, as the similarity of the two most similar objects in the different clusters.

The tree is constructed by feeding hierarchical clustering with the similarity measure: starting from all singletons, each sweep of the algorithm merges the pair with the smallest cardinality among the K most similar pair of clusters, the cardinality of a pair being defined as the sum of the cardinality of the corresponding two clusters. The cardinality of a cluster is the number of elements in the cluster. In one embodiment of the present disclosure the parameter K may be set to K=5, in this way the closest first agglomerative criterion is softened by introducing a competing smallest first principle that tends to produce better balanced tree decreasing the computational complexity of the calibration process. In general, different values of K result in different flavors of the clustering since K controls the amount of balancing on the attained tree. For example, when K=1 the proposed method subsumes the standard agglomerative single-linkage clustering with no balancing; when K is greater or equal half the number of images a perfect balanced tree is obtained, but the clustering is poor, since distance is largely disregarded.

As one example illustration, the tree produced by this method is illustrated in FIG. 6, the leaves of the tree correspond to two calibrations groups with similar EXIF parameters. The aforementioned similarity measure promotes the merging of clusters with similar EXIF parameters at early stages of the agglomerative process. This is illustrated in FIG. 6, where the nodes 701, 702 represent merging between models obtained from the first calibration group A, and 703, 704, 705, 706 are merging among models coming from calibration group B. Only at the end of the process the node 707 represents a model obtained from different calibration groups are merged.

During the clustering iteration, every time a merge is attempted one of the corresponding modeling actions is taken:

(i) Projective stereo modeling: this step is performed when two images are merged, for example at nodes 701, 703, 704.

(ii) Resection/intersection: when an image is added to a cluster as happen at nodes 702, 706.

(iii) Merging two models and autocalibration: when two non trivial clusters are merged. This is the case of node 705, and 707.

In projective stereo modeling, the fundamental matrix relating the two merged images is computed from point correspondences, hence the canonical projective camera pairs are obtained from the fundamental matrix. These cameras are refined by estimating the plane at infinity exploiting a coarse estimate of the focal based on the images diagonal. A cheirality test is executed and the 3D coordinates of the tied points are obtained by intersection. The cheirality of a point with respect to a given camera is the property of that point that specifies that it lies in front of or behind the camera. For example, intersection can be performed by the iterated linear least square methods.

Gross error can affect the results, therefore it is desirable to gain robustness to outlier exploiting ad hoc strategies, such as those described henceforth.

As an example, 3D points can be pruned by analyzing the condition number of the linear system and/or their reprojection error. For this aim two tests are deployed in the present disclosure. The first test discards ill-conditioned intersections, using a threshold on the condition number of the linear system. In some embodiments of the present disclosure the threshold is set to $10^{-4}$. The second test applies the so-called X84 rejection rule in order to recognize inliers.

In general, the intersection module obeys the following strategy. As soon as one track reaches length two in a given model (i.e. at least two images of the track belongs to the model), the coordinates of the corresponding tie-point are computed by intersection. If the operation fails (because of one of the two tests described above) the 3D point is provisionally discarded but the track is kept. An attempt to compute the tie-point coordinates is undertaken every time the length of the track increases within the model. Finally bundle adjustment is run to improve the model.

The resection/intersection step consists in augmenting a model by adding a single uncalibrated image. The tie-points belonging to the model that are also visible in the image to be added provides a set of 3D-2D correspondences, that are exploited to glue the image to the partial model using the Direct Linear Transform algorithm inside MSAC, followed by non linear minimization of the reprojection error at the end. After resections, tie-points are updated by intersection previously described. Optionally bundle adjustment can be run on the resulting model.

The merging step consists in estimating a transformation that bring the two partial models onto the same reference frame. The transformation is a similarity transformation if both the models are Euclidean, otherwise the transformation is a projectivity. If one of the two models is Euclidean, the projectivity that brings the projective model onto the Euclidean one is sought, thereby recovering its correct Euclidean reference frame. The transformation is recovered employing the direct linear transform algorithm inside the MSAC framework. Different quantities can be used to compute residual in the MSAC iterations, for example the lengths of the 3D segments that connect corresponding points can be used as residual. However, given the scale ambiguity, setting the inlier threshold can be hard to set, therefore in one embodiment the average length of the 2D projections in the images of the 3D points are used to define residuals; in this way a meaningful inlier threshold in pixels can be set easily.

The new model is refined with bundle adjustment (either Euclidean or projective) and upgraded to a Euclidean frame when it is possible thanks to autocalibration.

One example technique that may be employed to perform autocalibration is described hereafter. Two main stages can be singled out. The first stage consists in computing a consistent upgrading collimation so as to transform the model into a Euclidean one, given a guess of the internal parameter of two cameras. This step yields an estimate of all cameras but the first. The second step consists in scoring all the internal parameter of the cameras based on the likelihood of skew, aspect ratio and principal point. More precisely the autocalibration procedure takes as input a set of projective projection matrices together with their viewports and returns the upgraded, Euclidean counterpart of the camera matrices. All the cameras are normalized thanks to the viewport matrix. A viewport matrix is defined as $$\begin{pmatrix} \sqrt{w^2+h^2} & 0 & w \\ 0 & \sqrt{w^2+h^2} & h \\ 0 & 0 & 2 \end{pmatrix}$$

where w and h are the width and the height of each image. In this way, the principal point expected value is (0, 0) and the focal range is [⅓, 3]. Next the space of all possible calibration parameters is approximated by assuming null skew, unit aspect ratio, and principal points centered in the image. The search space is reduced in this way to a bounded region of the real plane. The error introduced with this approximation is usually well within the radius of convergence of the subsequent non linear optimization. The space of the internal parameters of the cameras is enumerated and the best solution is refined via non linear-least square. The process iterates over the possible focal pairs. For each sample a candidate the upgrading collimation H, is computed by estimating the plane at infinity. Hence, each camera is upgraded via H, its internal parameters K are estimated and used to compute the following cost function:

$$C(K) = a|k_{1,2}| + b|k_{1,1} - k_{2,2}| + c|k_{1,3}| + d|k_{2,3}|$$

where $k_{i,j}$ denotes the (i,j) entry of K and a, b, c, d are suitable weights.

C(K) reflects the degree to which K meets a-priori expectations on the internal device parameters: the first term takes into account the skew, which is expected to be 0, the second one penalizes cameras with aspect ratio different from 1 and the last two weigh down cameras where the principal point is away from (0, 0).

All the camera costs are aggregated and the focal pair that correspond to the minimum cost is selected:

$$\{f_1, f_1\} = \underset{f_1, f_2}{\arg\min} \sum_K C^2(K)$$

The obtained cameras are hence refined via non linear least square and de-normalized.

In principle, autocalibration requires a minimum number of images to work, e.g. 4 images with known skew and aspect ratio. However, it is desirable to maintain an "almost" Euclidean reference frame from the beginning, to better condition subsequent processing. Therefore, autocalibration can be triggered for models starting from two images. The result is an approximate Euclidean upgrade; in fact, these models can be still regarded as projective, until they reach a sufficient cardinality. After that point autocalibration is not performed any more and the internal parameters of each camera are refined further only with bundle adjustment, as the computation proceeds. In order not to hamper the process too much, the internal parameters of a camera become fixed after they have been bundle-adjusted together with a given number of cameras.

After autocalibration is performed, the hierarchal structure and motion algorithm is run again on the calibrated images. Differently form the uncalibrated case, the EXIF information are not taken in consideration in the specification of the similarity measure, this result in a different dendrogram produced by the hierarchical clustering algorithm, as can be appreciated from FIG. 7. As an example implementation, the similarity measure between two images $I_i, I_j$ may be specified as:

$$a_{i,j} = \frac{1}{2} \frac{|S_i \cap S_j|}{|S_i \cup S_j|} + \frac{1}{2} \frac{CH(S_i) + CH(S_j)}{A_i + A_j},$$

where $S_i$ and $S_j$ represent the set of visible tie-points in both the images, and CH(•) is the area of the convex hull of a set of image points and $A_i$ ($A_j$) is the total area of image $I_i$ ($I_j$). Since the image are calibrated the action undertaking during the merge of clusters change accordingly. In particular, during the clustering iteration, every time a merge is attempted one of the corresponding modeling actions is taken:

(i) Stereo modeling: this step is performed when two images are merged, for example at nodes 801, 803, 804.

(ii) Intersection/resection: when an image is added to a cluster as happen at nodes 802, 806.

(iii) Merging two models: when two non trivial cluster are merged. This is the case of node 805, 807 and 808.

In stereo modeling, the parameters of the relative orientation of two given acquisition devices are obtained by factorization of the essential matrix that relates the two considered images. This is equivalent to know the external parameters of the two cameras in a local reference frame, and, since the internal parameters of the device have been already estimated in the autocalibration process, the two camera matrices are readily set up. Then tie-points can be obtained by intersection from the tracks involving the two images, and the model can optionally be refined with bundle adjustment.

It is worth noting that in order for the stereo-modeling to be successful the two images must satisfy two conflicting requirements: to have both a large number of tie-points in common and a baseline sufficiently large so as to allow a well-conditioned solution. The first requirement is implemented by the similarity measure used to fed the agglomerative clustering, but the second is not considered; as a result, the pairing determined by image clustering is not always the best choice as far as the relative orientation problem is concerned. Since the clustering and the structure-and-motion processing occurs simultaneously, these pairs will be discarded by simple sanity-checks before and after attempting to perform the stereo-modeling. The a-priori check requires that the relationship between the two images is described by a fundamental matrix (instead of a homography), according to some model selection criteria. The a-posteriori check considers the residual error and the cheirality check of the points before and after the bundle adjustment.

Intersection can be performed by the iterated linear Least Square method. In one embodiment of the present disclosure several sanity checks can be performed. As one example, points can be pruned by analyzing the condition number of the linear system: ill-conditioned intersections, can be discarded using a threshold on the condition number of the linear system. In addition, the so-called X84 rule can be adopted, and/or a safeguard threshold on the reprojection error can be set. In general, the intersection step obeys the following strategy. As soon as one track reaches length two in a given model (i.e. at least two images of the track belongs to the model), the coordinates of the corresponding tie-point are computed by intersection. If the operation fails (because of one of the sanity checks described above) the 3D point is provisionally discarded but the track is kept. An attempt to compute the tie-point coordinates is undertaken every time the length of the track increases within the model.

The tie-points belonging to the model that are also visible in the image to be added provides a set of 3D-2D correspondences, that are exploited to glue the image to the partial model. This is done by resection, where only the external parameters of the camera device are to be computed. According to an example embodiment of the present disclosure, the PPnP algorithm inside MSAC can be adopted, followed by non-linear minimization of the reprojection error at the end. After resection, which adds one image to the model, tie-points are updated by intersection, and bundle adjustment is run on the resulting model.

The merging step consists in conflating two partial independent (i.e., with different reference systems) into one. The first step is to register one onto the other with a similarity transformation. The common tie-points are used to solve an absolute orientation (with scale) problem with MSAC. As discussed before, different quantities can be used to compute residual in the MSAC iterations, such as the lengths of the 3D segments that connect corresponding points can be used as residual. However, in order to alleviate the difficulties yielded by scale ambiguity, the average length of the 2D projections in the images of the 3D points are used to define residuals; in this way a meaningful inlier threshold in pixels can be set easily.

The final transformation, computed with the Orthogonal Procrustean (OP) method minimizes the proper geometric residual, i.e. the sum of squared distances of 3D points.

Alternatively, an Euclidean reconstruction can be obtained with global Structure from motion techniques, that solve all cameras external parameters simultaneously from all available relative motions.

Once the models are registered, tie-points are updated by intersection, and the new model is refined with bundle adjustment.

It is well known that bundle adjustment techniques are known to be computationally demanding. Therefore, in the pursuit of further complexity reduction, a strategy that consists in reducing the number of images to be used in the bundle adjustment in place of the whole model is employed. This strategy can be seen an instance of local bundle adjustment, which is often used for video sequences, where the active images are the most recent ones. In particular, this method can be defined with reference to the model merging step, as the resection is a special case of the latter. Consider two models A and B, where A has fewer images than B. The smallest model is transformed onto the largest (if one is projective it is always the smallest). The bundle adjustment involves all the images of A and the subset of images of B that share some tracks with A (tie-points that are visible in images in both models). Let us call this subset B'. All the tie-points linking B' and A are considered in the bundle adjustment. Images in B\ B' are not moved by bundle adjustment but their tie-points are still considered in the minimization in order to anchor B' through their common tie-points. The tie-points linking only cameras in B\ B' are not considered. This strategy is sub-optimal because in a proper bundle adjustment all the images in B should be involved, even those that do not share any tie-point with A. However, a bundle adjustment with all the images and all the tie-points can be run at the end to obtain the optimal solution.

Compared to the standard sequential approach, the framework presented in this disclosure has a lower computational complexity, is independent of the initial pair of images, and copes better with drift problems, typical of sequential schemes. Therefore, the hierarchical structure and motion algorithm presented in this disclosure represents a significant technical advance over existing techniques.

Figure 8:
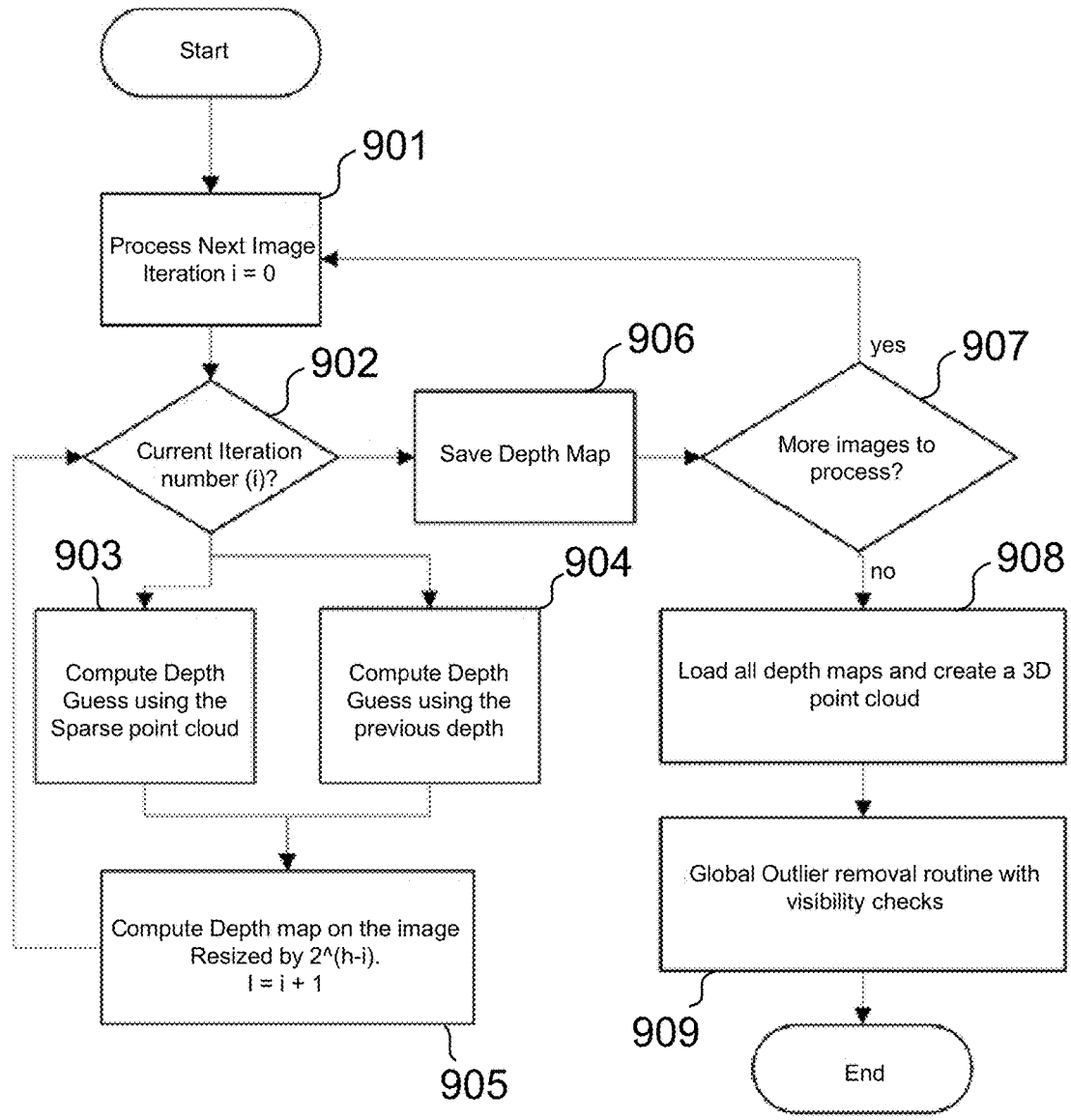
FIG. 8 shows the procedure for the depth maps computation and the creation of the stereo point cloud.
Figure 9:
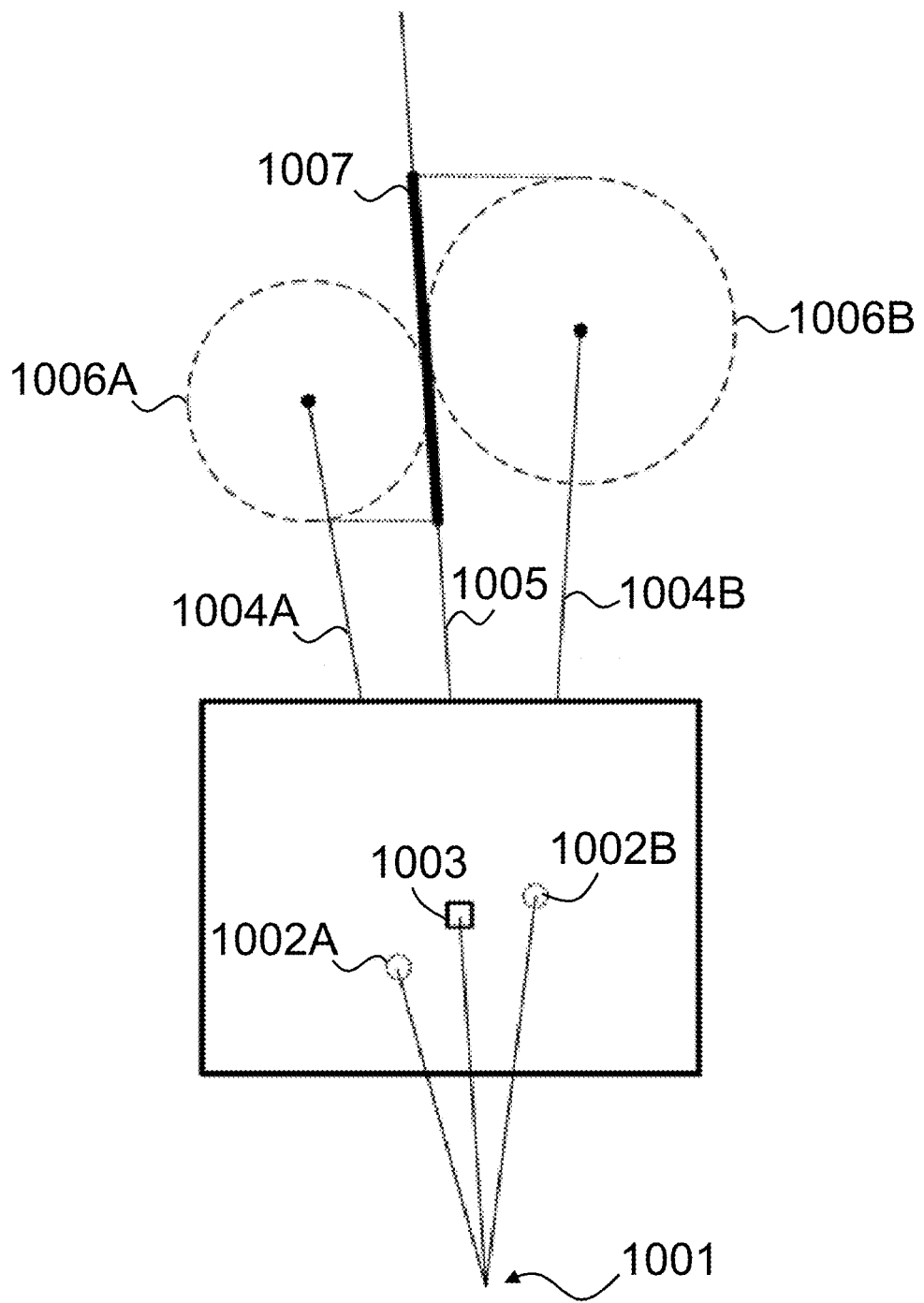
FIG. 9 shows how the depth search range of a single pixel is computed starting from sparse points of known 3d positions.
Figure 11:
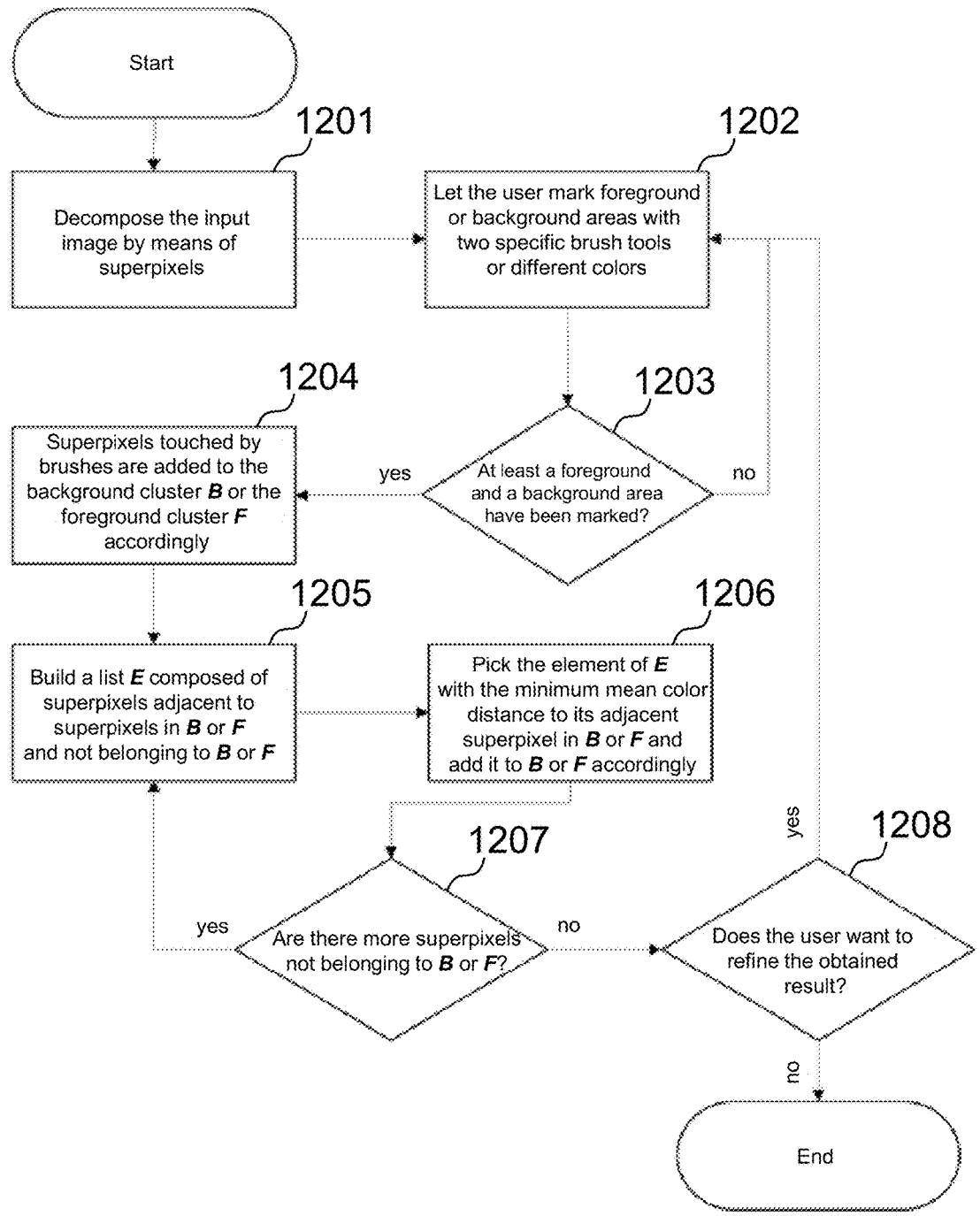
FIG. 11 shows the procedure for segmenting the foreground and the background of an image with user assistance.

Referring to FIG. 8, a Multiview stereo algorithm with a global outlier removal procedure is shown generally. This procedure is devoted to increase the accuracy of the final 3D space. The global outlier removal method deployed in the present disclosure and illustrated in FIGS. 9, 10, 11 is based on specific criterions including the matching score and the visibility information of each point. Effectively, in this embodiment, the method comprises the following main steps: (901-907) compute a depth map for each image; (908) lift every depth map in 3D space; (909) remove spurious points using visibility checks. Subsequent steps consist in computing the approximate normal at each 3D point by fitting a plane using the closest neighbor, and, finally, in running a surface reconstruction algorithm. For example, the Poisson reconstruction algorithm can be performed to generate the surface. Other techniques can be performed to generate the surface alternatively or in addition to the Poisson algorithm.

Referring still to FIG. 8, the graphical diagram shows a flow chart describing the global outlier removal method. From block 901 to 905 a multi-resolution pyramidal approach is followed: At 903 a depth guess is obtained using the information of the 3D sparse cloud: for every image the 3 images that have in common more visible 3D keypoints can be considered. For every point in the image the candidate depths are searched using block matching and the normalized cross correlation score: at first images are rectified, then matching is performed on rectified images along the horizontal line that correspond to epipolar lines and transformed back to original images via a 1D homography. The depth search range of a pixel is bounded by considering only a segment onto the corresponding optical ray leveraging on the depths of the closest keypoints as illustrated in FIG. 9. The normalized cross correlation profiles are used to build a histogram for every pixel, such that it aggregates the votes, weighted by their score value, casted by the local peaks of the correlation profile along the corresponding epipolar. The k bins of the histograms with the highest score are retained as the candidate depths for the pixel. The k candidate depths are computed for every point in every image and stored in the map, together with their corresponding correlation values. In the present disclosure the value of k is set to k=5. The whole process can be efficiently implemented on GPUs. At the first level of the pyramid, when i=0, the depth guess map is refined via Markov Random Field optimization, leveraging on a cost function composed by an unary function which depends on the value at pixel and a smoothness term depending on pairwise interaction.

In the present disclosure the unary function employs the Geman-McClure score function to improve further the robustness against spurious matches. In the subsequent iterations of this pyramidal phase, i>0, at 904, the depth guesses are computed on the original image resize by a factor of $2^{n-i}$, h being the number of total iterations, exploiting the depth maps computed in previous level. Next at block 906 the depth map is saved. If, at block 907, more images have to be processed, then the procedure is repeated from block 901 to 906. Otherwise all the created depth maps are lifted to 3D points cloud at block 908, this information is encapsulated in an octree structure that accumulates the score coming from each depth from each image.

The 3D information is used to perform visibility checks and recognize outliers at block 909. More precisely, according to an aspect of the present disclosure, at first each point is project on each image 2D pixel cell. For each pixel cell, the point with the maximum matching score and viewed by the image itself is considered to be occluding the other point of the same cell. This concept is illustrated in FIG. 10 where an example of occlusors points is presented with respect to a configuration of three cameras. Points 1103A, 1102A, 1103C are projected on the same image 2D pixel cell by the camera 1111A, the same holds for points 1102B, 1103B, with respect to camera 1101B, and for points 1103D, 1102C as regards camera 1101C. Points 1102A, 1102B and 1102C lies on the actual surface. Points 1103A, 1103B are occlusors of points 1102A, 1102B. Referring still to block 909, a function of the matching score of the occlusors is hence subtracted from the matching score of the other points. When a point reaches a negative matching score is marked as outlier and removed. The procedure is iterated several time over all the images until convergence, i.e. no more points are removed.

Referring again to FIG. 9, the sparse structure information of the scene is used to guide the stereo matching. The depth search range of each pixel of each image is limited by using the sparse 3D points viewed by the image itself. In order to determine the depth search range of a generic pixel 1003 of a generic image only the five image points that are closer to the points are considered. Depending on the desired level of approximation, a different number of closest points can be considered: reducing the number of closest points results in a smaller depth search range, whereas augmenting the number of closest points produce a larger depth search range. In FIG. 9 two out of five of such closest points 1002A and 1002B are depicted for sake of visualization. The 3D positions of these closest points are the middle points of five segments on the respective optical rays whose length equal to distance between those points and the optical ray 1005 determined by the generic pixel 1003 and the camera center 1001. The depth search range for the generic pixel 1003 is hence determined as the convex hull of the union of the projections of these segments onto the optical ray 1005. With reference to FIG. 9, the depth search range 1007 is illustrated as the segment defined by the projections of the two segments centered in 1006A and 1006B on the optical axis 1004A and 1004B.

Figure 12:
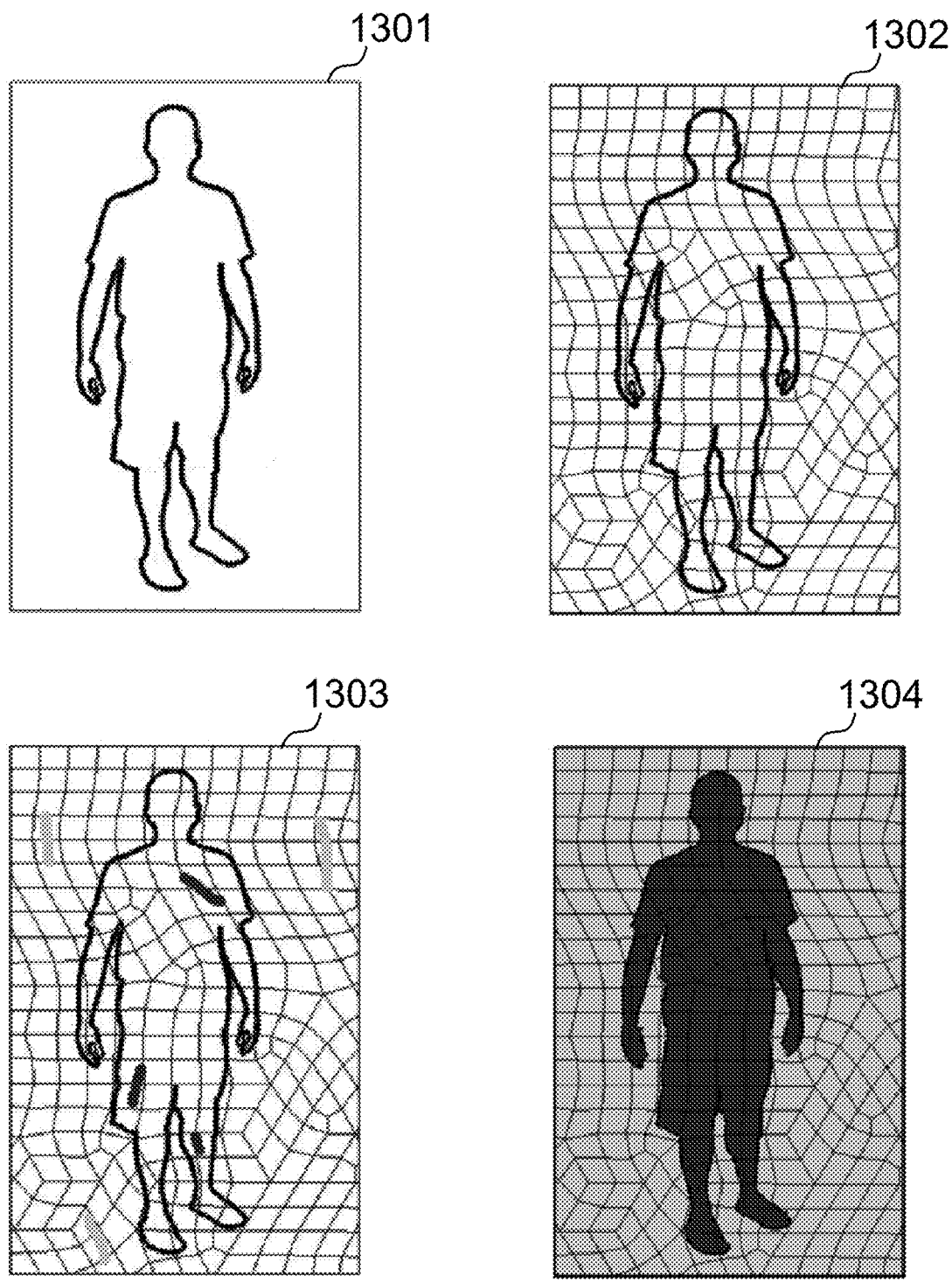
FIG. 12 shows an example of segmentation and silhouette extraction.

Referring to FIG. 11 and FIG. 12, silhouettes of the subject in the 2D images are used to guide the stereo processing and to remove the background area coherently. An interactive silhouette selection tool is defined. In one embodiment of this disclosure, the original image 1301 is decomposed into superpixels, i.e. cluster of continuous pixels with low color variation, as shown in FIG. 12. This action is undertaken at block 1201 of the flow chart reported in FIG. 11. The user is asked to mark a background area and a foreground area at block 1202. In one embodiment, the user can annotate the foreground and the background areas with two specific brush of different colors.

As one example illustration, the annotated image is shown in 1303, where strokes of different colors labels the superpixels belonging to the background and the ones of the foreground. At block 1203, if the foreground and the background have not been marked, then the procedure is repeated from block 1202 to 1203. The algorithm automatically classifies background and foreground superpixels with a region growing approach: at block 1204 superpixels touched by brushed are added to the corresponding background and foreground clusters. At block 1205, the superpixel that are not yet assigned to a cluster are organized in a list. At block 1206, the element of the list with the minimum mean color distance to its adjacent superpixel are assigned to the cluster of its adjacent superpixel. Blocks 1205 and 1206 are repeated until all the superpixels have been assigned to a cluster, as required in block 1207. When all the superpixels have been labeled, if, at block 1208, the user wants to refine the result the process is repeated from block 1202 to block 1208 is satisfied: otherwise the obtained silhouette is outputted. As one example illustration, the resulting silhouette is depicted in 1304. Silhouettes may be used as input of a space carving technique or to remove the background during the stereo matching phase.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

What is claimed is:

1. A method based on Structure from Motion for processing a plurality of sparse images of an object acquired by one or more acquisition devices to generate a sparse 3D points cloud and of a plurality of internal and external parameters of the acquisition devices obtained by processing the images, comprising the following steps:
    (a) collecting the images;
    (b) extracting keypoints from each image and generating a descriptor for each keypoint;
    (c) organizing the images in a proximity graph;
    (d) pairwise image matching and generating keypoints connecting tracks according to maximum proximity between the keypoints;
    (e) performing an autocalibration between image clusters to extract the internal and external parameters of the acquisition devices, wherein a plurality of calibration groups is defined, each calibration group containing a plurality of image clusters, and wherein a clustering algorithm is used to iteratively merge the clusters in a model expressed in a common local reference system, the clustering being carried out starting from clusters belonging to a same calibration group; and
    (f) performing a Euclidean reconstruction of the object in form of the sparse 3D point cloud based on the parameters extracted at the preceding step.

2. The method according to claim 1, wherein the step of performing an autocalibration is hierarchical and comprises a projective stereo modeling step if merging single images merging, a resection/intersection step if adding an image to a cluster, and a merging of two models step if merging two groups reconstructed independently from each other.

3. The method according to claim 1, wherein the images are associated to EXIF parameters and the calibration groups are formed based on similarity between the EXIF parameters of the images.

4. The method according to claim 1, wherein, during the step of performing a Euclidean reconstruction, a plurality of calibration groups is defined, each calibration group containing a plurality of image clusters, and wherein a clustering algorithm is used to iteratively merge the clusters in a model expressed in a common local reference system, the clustering being carried out starting from clusters belonging to a same calibration group.

5. The method according to claim 1, further comprising a step of generating a 3D model with a Multiview Stereo algorithm based on the sparse 3D points cloud and on said internal and external parameters of the acquisition devices, the Multiview Stereo algorithm computing a depth map for each image and subsequently generating a dense 3D points cloud based on all computed depth maps.

6. The method according to claim 5, wherein outliers are removed from the dense 3D points cloud by applying visibility constraints.

7. The method according to claim 1, wherein extracting keypoints comprises calculating a global response score threshold for each keypoint, and wherein a predetermined number of keypoints with higher global response scores are taken into account, remaining keypoints being disregarded.

8. The method according to claim 1, wherein the descriptor is calculated on a circular region placed around the keypoint and subdivided into subregions, the descriptor comprising a histogram having a predetermined number of bins configured to assume different values, the values being calculated based on a response of each single pixel belonging to each subregion to a steering filter, which is steered in a predetermined number of orientations.

9. The method according to claim 1, wherein organizing the images in the proximity graph comprises an iteration of a maximum spanning tree algorithm to identify a maximum number of connections between images corresponding to a maximum similarity score by:
(c1) identifying a path connecting the images, such that the similarity is maximum for adjacent images;
(c2) saving image couples for subsequent processing;
(c3) setting to zero a similarity of the identified image couples;
(c4) identifying a further path connecting the images, such that the similarity is maximum for the adjacent images;
(c5) saving further image couples for the subsequent processings;
(c6) setting to zero the similarity of the identified further image couples; and
(c7) iterating steps (c4)-(c6).

10. The method according to claim 1, further comprising a step of extracting silhouettes from a background of an image that comprises:
(g) subdividing the image in groups of contiguous pixels with color variation lower than a predetermined threshold;
(h) displaying the image to a user;
(i) having the user identify at least a foreground area in a foreground and at least a background area in the image by tracing at least two marks on the image, the marks being traced with different modalities to indicate the foreground area and the background area respectively;
(j) creating two clusters of groups of the pixels relative to the foreground and the background areas respectively;
(k) assigning a group of pixels touched by each mark of the user to one of the two clusters of group of pixels based on the modality of the mark;
(l) creating a temporary list of groups of pixels not yet assigned to one of the two clusters; and
(m) assigning iteratively the group of pixel which is present in the temporary list and has a minimum difference of mean color with respect to one of its adjacent groups of pixels to the cluster of group of pixel to which the one of its adjacent groups of pixels belongs.

11. The method according to claim 1, wherein data provided from one or more of gyroscopes, magnetometers, or accelerometers is included in determining neighboring images.

* * * * *